Patented Nov. 1, 1938

2,134,764

UNITED STATES PATENT OFFICE 2,134,764

METHOD OF MAKING CORN GLUTEN PLASTIC

Gerald J. Leuck, Evanston, Ill., assignor, by mesne assignments, to Corn Products Refining Company, New York, N. Y., a corporation of New Jersey No Drawing. Application June 17, 1935,
Serial No. 27,138

1 Claim. (Cl. 106—38)

This invention relates to the production of plastic and adhesive substances (referred to generally herein as plastics or plastic substances); and the object of the invention is the production of such substances from corn gluten.

Corn gluten, as the term is here used, is a by-product of the manufacture of starch from corn. It consists of the insoluble protein of the corn with a very considerable admixture, ordinarily, of starch. In fact, the ordinary corn gluten which tails off from the starch tables, commonly used for separating gluten from starch, may contain about 50% protein, 35% starch and 15% other corn constituents such as fibre, pentosans, oil and ash. Gluten is used to refer specifically to the protein fraction of corn, but in common parlance in this industry the term "corn gluten" is used to designate the protein-starch mixture above referred to and the term is so used herein. That is, all corn gluten contains in addition to the other corn substances mentioned a considerable amount of starch which can be removed only by rather expensive methods.

The present invention is based upon the discovery that this protein and starch mixture may be plasticized and rendered tough, hard and water resistant first by treatment with formaldehyde and acid, in the presence of a sufficient quantity of water and then by being subjected to high temperatures.

Plastic substances have been made from corn protein, after removal of all of the starch by chemical treatment, the removal of the starch having been regarded as necessary because of the solubility, partial or complete, of the reaction substance or substances of the starch in the final product which seriously impairs the water resistance of the product. By the method of this invention the starchy materials are rendered insoluble by the treatment to which the "corn gluten" is subjected so that a plastic product may be produced, and made effectively water resistant without the expense of purifying the "corn gluten" of its starch content.

The process of the invention may be applied to the raw corn gluten as it comes from the gluten settlers; or the material may be first treated to gelatinize, modify, dextrinize or convert the starch; and these different pretreatments of the gluten will result in different characteristics in the finished product. For example, corn gluten subjected to a gelatinizing pre-treatment will yield, when treated in accordance with the present invention, a tougher but softer final product than a product made from corn gluten after a dextrinization pre-treatment.

The ingredients used may be mixed by any known method which will give an intimate and uniform mixture. In some cases ordinary stirring will be sufficient, and in other cases, particularly if any of the solid ingredients are not in a finely comminuted state, it will be found advantageous to bring about intimate mixing as by use of differential rolls.

The formaldehyde should be used in a form suitable for thorough mixing with the other ingredients, for example, either the liquid preparation known as formalin, or the solid preparation known as paraformaldehyde, may be used. To obtain the best results the acid used should be a strong mineral acid, that is an acid having a strength of the order of magnitude of sulphuric or hydrochloric acid. Usable products could be made by the employment of other acids than those mentioned.

Depending upon the use to which the product is to be put, the curing or heat treatment of the plasticized substance may be under quite widely different temperature conditions. For example, if it is desired to cure a molded mass with as little deformation as possible, a gradual increase from room temperature to say 250° F. is desirable. If speed of curing rather than retention of exact form is the desideratum, in case the product serves as a water resistant adhesive, an initially high temperature may be used.

The process is not limited to any particular proportions of starch to protein in the material treated.

The products, generally speaking, may be molded and subjected to heat and some pressure for the production of hard, tough water resistant bodies of whatever shape may be desired; or they may be spread in a fluid or semi-fluid state, as adhesives, on wood, paper or other surfaces and subjected to heat for the production of water resistant bonds; or, in the manufacture of molded articles, the products may be used as binders for compounding with filling material such as wood flour.

The general term "modification" as applied to the pre-treatment by which the character of the starch in the corn gluten is changed, is intended to include the range of treatments from gelatinization through conversion to dextrine.

The following examples are given for the purpose of illustration. They are not to be considered as limiting the invention to the particular formulas specified, the intention being to cover all variations and modifications within the scope of the hereto appended claim.

Example 1

100 parts of corn gluten, containing 50% by weight of protein, 35% of starch and 15% other corn substances, is mixed with 25 parts of formalin (40% formaldehyde solution) by grinding or by otherwise mixing the materials until a reasonably homogeneous mass results. This mixture, after standing for a day, enclosed in a container to prevent evaporation, has mixed therewith 20 parts of a half normal water solution of hydrochloric acid. Nitric or sulphuric acid could be used. The resulting plastic material is molded under sufficient pressure to yield a compact product. The amount of pressure is not important except to insure the desired configuration. The molded product is heated in an oven to a temperature between 200° and 300° F., preferably 212° F., for two days by which treatment it acquires hardness, strength and water resistance.

Example 2

30 parts of corn gluten, of the same composition as the corn gluten of Example 1, is mixed with four times its weight of water in a semi-enclosed container and placed in an oven at 212° F. for five hours to gelatinize the starch. The treatment involves loss of about 5% of water. After cooling the material is mixed with 30 parts of formalin, 6 parts of a half normal water solution of sulphuric acid and 20 parts of water and the mixture allowed to stand for four hours. The formalin may be added first and the acid after an interval of time as in Example 1. The plasticized substance may be used as an adhesive for wood or paper. After the material has been spread between the articles to be pasted together, heat is applied, preferably a temperature of about 250° F. The bond is of very considerable strength and is water resistant.

Example 3

100 parts of corn gluten is first subjected to a dextrinization treatment with 300 parts of water and 10 parts of a half normal solution of hydrochloric acid (equal approximately to 0.2 part of anhydrous HCl), these substances being intimately mixed together and then spread out into thin layers and dried, at room temperature by a current of air. The product of this treatment is then placed in an initially cold oven and heated to 265° F.–275° F. for eight hours after the oven temperature has been raised to the point indicated. The material is then mixed with 25 parts of formalin, by means of differential rolls, and there is added thereto 20 parts of a half normal solution of hydrochloric acid. Wood flour in the proportion of 100 parts is then thoroughly mixed with the plastic substance. This composition, when molded and cured, as in the case of Example 1, yields a hard strong water resistant product.

The plastic substance may, however, be molded without the filler, or, by giving it the desired degree of fluidity by addition of water, it may be used as an adhesive and cured as in Example 2.

Example 4

100 parts of corn gluten is thoroughly ground in a pebble mill. 10 parts of half normal hydrochloric acid solution is introduced into the mill and the material again ground. The material is then subjected, without intermediate drying, to an oven temperature of 265°–275° F. for eight hours as in Example 3 for the purpose of dextrinizing the starch. The plasticizing and curing steps may be the same as in Example 3.

Example 5

The procedure is the same as in Example 3 except that the pre-treatment is such as to convert the starch in the gluten to British gum. The gluten, without acid, is placed in a cold oven and the temperature raised during a two hour period to 265–275° F. and maintained at this temperature for twenty hours.

It will be understood that methods for modifying the starch, to the extent desired, other than those specified in the above examples may be employed. The prescriptions given are merely illustrative.

I claim:

Process which comprises treating 100 parts of corn gluten with 25 parts of a 40% formaldehyde solution and with 20 parts of a half normal water solution of hydrochloric acid, and thereafter heating the material to a temperature between 200° and 300° F.

GERALD J. LEUCK.